United States Patent [19]

Pamer et al.

[11] Patent Number: 4,627,776

[45] Date of Patent: Dec. 9, 1986

[54] FASTENER

[75] Inventors: W. Richard Pamer; James A. Zils, both of Parma, Ohio

[73] Assignee: Russell, Burdsall & Ward Corporation, Brooklyn Heights, Ohio

[21] Appl. No.: 803,727

[22] Filed: Dec. 2, 1985

Related U.S. Application Data

[63] Continuation-in-part of Ser. No. 733,978, May 14, 1985.

[51] Int. Cl.$^4$ ............................................ F16B 37/04
[52] U.S. Cl. ..................................... 411/179; 411/187
[58] Field of Search ............... 411/181, 174, 176, 177, 411/179, 180, 187, 188, 81, 107, 166

[56] References Cited

U.S. PATENT DOCUMENTS

| | | | |
|---|---|---|---|
| 3,253,631 | 5/1966 | Reusser | 411/179 |
| 3,270,355 | 9/1966 | Tildesley | 411/176 X |
| 3,754,677 | 8/1973 | Hug | 411/119 X |
| 3,878,599 | 4/1975 | Ladouceur | 411/179 X |
| 4,389,766 | 6/1983 | Capuano | 411/179 X |
| 4,432,681 | 2/1984 | Capuano | 411/180 |
| 4,468,161 | 8/1984 | Krueger | 411/171 |

Primary Examiner—Gary L. Smith
Assistant Examiner—Adrian H. Whitcomb, Jr.
Attorney, Agent, or Firm—Yount & Tarolli

[57] ABSTRACT

An improved fastener includes a shank section which extends outwardly from a head section. The head section has a rim with an inner side surface which cooperates with an outer side surface of the shank section to form a groove. The inner side surface of the rim includes a plurality of indentations which are separated by side surfaces. The outer side surface of the shank section also includes a plurality of indentations which are separated by side surfaces. The side surfaces on the rim are disposed radially outwardly of the indentations in the shank section and cooperate with the shank section to form a plurality of constrictions. Similarly, the indentations in the rim are disposed outwardly of the side surfaces of the shank section and cooperate with the side surfaces of the shank section to form a plurality of constrictions. The constrictions apply deformation forces to material on which the fastener is mounted upon application of torque load to the fastener. The indentations in the rim and shank section of the fastener apply shear forces to the material of the member upon the application of torque loads to the fastener.

9 Claims, 5 Drawing Figures

FASTENER

BACKGROUND OF THE INVENTION

This application is a continuation-in-part of U.S. patent application Ser. No. 733,978, filed May 14, 1985 by W. Richard Pamer and James A. Zils and entitled "Fastener".

An improved fastener disclosed in U.S. patent application Ser. No. 733,978 is held against axial rotational movement relative to a sheet metal member by the interaction between the sheet metal member and the fastener. The fastener has a shank section which extends axially outwardly from and is coaxial with a head section of the fastener. The head section includes a rim which cooperates with the shank section to define a groove in which the material of the sheet metal member is received.

In order to prevent rotational movement of the fastener relative to the sheet metal member upon the application of torque load to the fastener, indentations are formed in the rim and shank sections of the fastener. These indentations have corners which apply shear or torsional forces to the material of the member. To further resist relative rotation between the member and the fastener, side surfaces of the shank section and the rim of the fastener cooperate to form constrictions. Upon the application of a torque load to the fastener, the constrictions apply deformation forces to the material of the member to resist relative rotation between the fastener and the member.

The fastener disclosed in the aforementioned U.S. patent application Ser. No. 733,978 has constrictions formed between arcuate side surfaces on the shank section and flat side surfaces on the rim of the fastener. Although these constrictions are effective to apply deformation or cold working forces which tend to extrude the material of the sheet metal member to resist rotation, it is believed that the rotation resisting characteristics of the fastener could be enhanced by increasing the number of constrictions.

SUMMARY OF THE PRESENT INVENTION

The present invention provides a new and improved fastener which is held against axial and rotational movement relative to a member by the interaction between the member and the fastener. The fastener has a shank section which extends axially outwardly from and is coaxial with a head section of the fastener. The head section includes a rim which cooperates with the shank section to define a groove in which the material of the member is received. Side surfaces on the rim are disposed radially outwardly of indentations in the shank section to form a first group of constrictions. Indentations in the rim of the fastener are disposed radially outwardly of side surfaces on the shank section to form a second group of constrictions. The two groups of constrictions apply deformation forces to the material of the member upon application of torque loads to the fastener to resist relative rotation between the fastener and a member upon which it is mounted.

Accordingly, it is an object of this invention to provide a new and improved fastener which is adapted to be received in a member and held against rotational movement relative to the member by the interaction between the member and the fastener and wherein rotation is resisted by a first group of constrictions formed between side surfaces on a rim of the fastener and indentations in a shank section of the fastener and by constrictions formed between indentations in the rim of the fastener and side surfaces on the shank section of the fastener.

BRIEF DESCRIPTION OF THE DRAWINGS

The foregoing and other objects and features of the present invention will become more apparent upon a consideration of the following description taken in connection with the accompanying drawings wherein.

DESCRIPTION OF A SPECIFIC PREFERRED EMBODIMENT OF THE INVENTION

General Description

Figure 1:
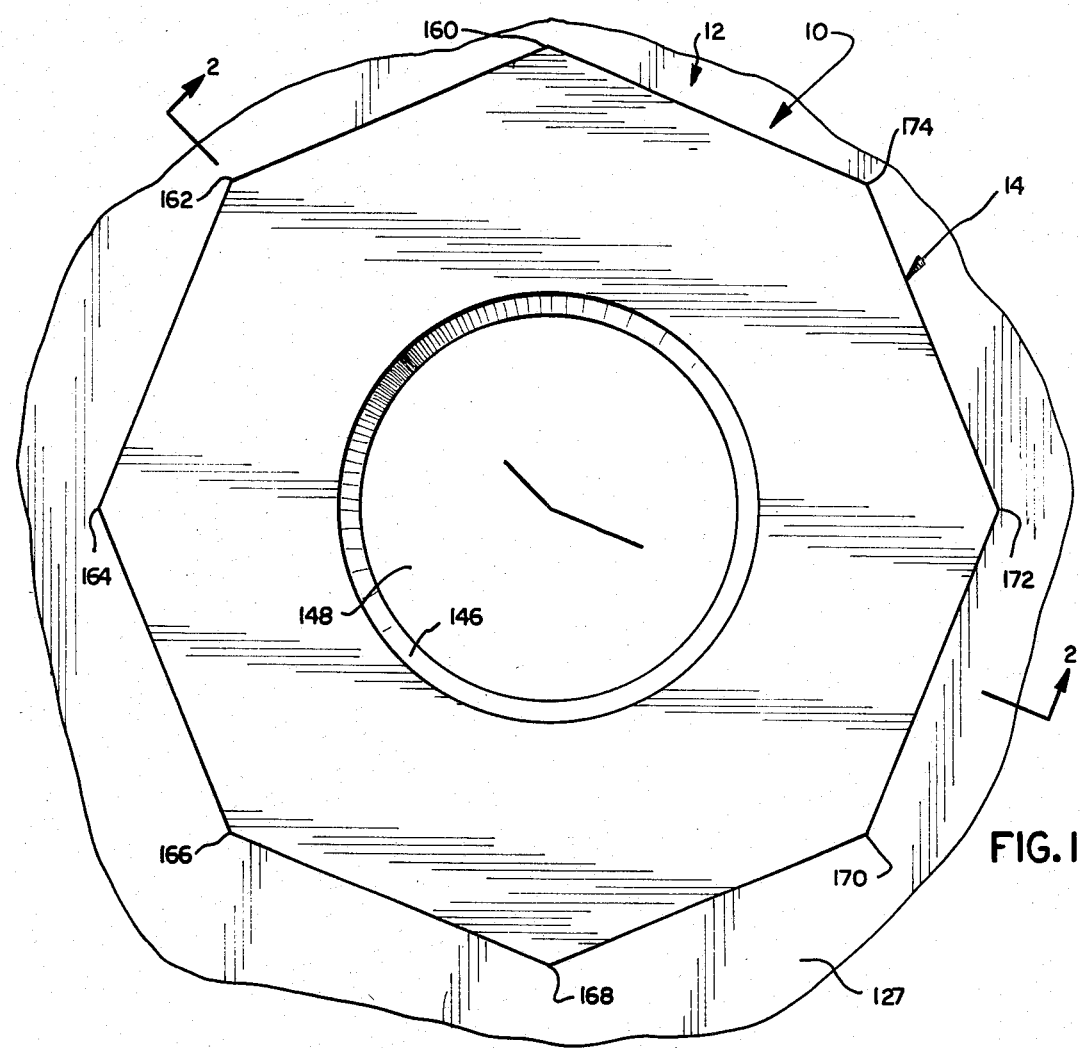
FIG. 1 is a top plan view illustrating the relationship of a fastener constructed in accordance with the present invention to a sheet metal member in which the fastener is mounted.
Figure 2:
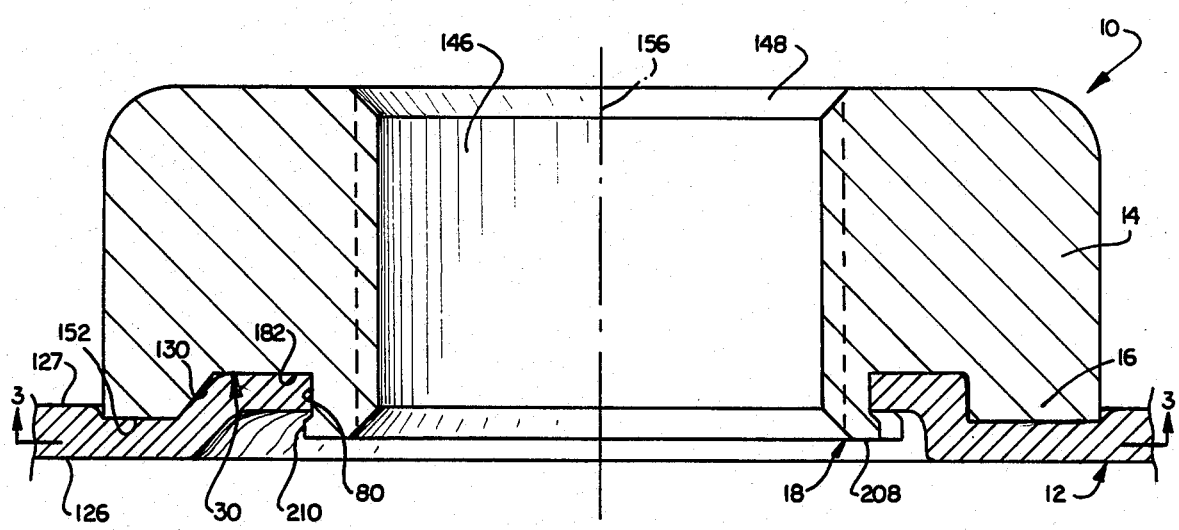
FIG. 2 is a sectional view, taken generally along the line 2—2 of FIG. 1, illustrating the manner in which the sheet metal member is forced into a groove formed between a shank section and a rim on a head section of the fastener.
Figure 3:
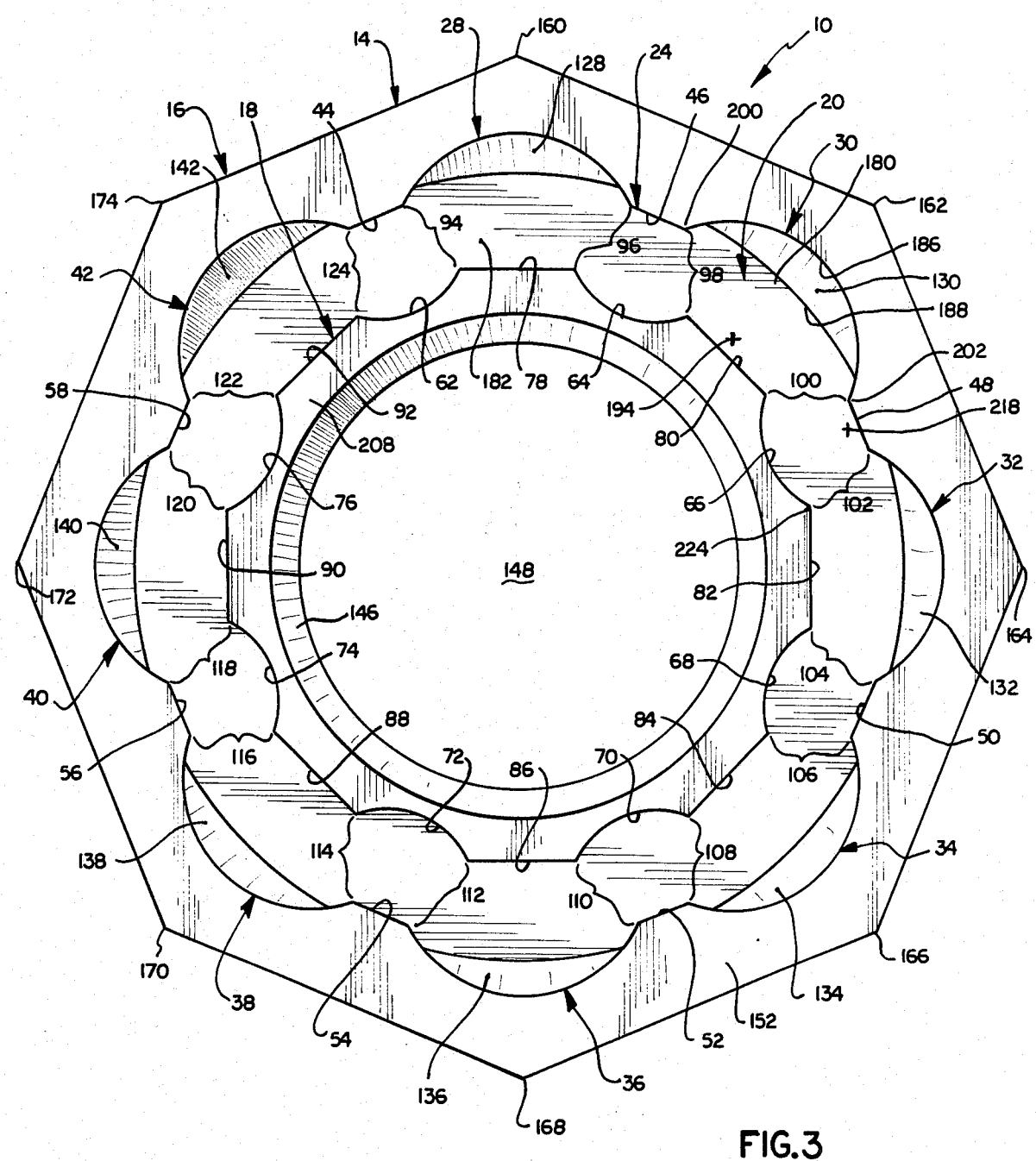
FIG. 3 is an enlarged bottom plan view, taken generally along the line 3—3 of FIG. 2, and illustrating the relationship between the rim and shank section of the fastener.

An internally threaded fastener 10 (FIGS. 1 and 2) constructed in accordance with the present invention is received in a sheet metal member 12 and is held against axial rotational movement by the interaction between the sheet metal member and the fastener. The fastener has an octagonal head section 14 (FIG. 1) with an axially extending rim 16 (FIG. 2). The rim 16 cooperates with an axially extending shank section 18 to form a generally annular groove 20 (FIG. 3). Material of the sheet metal member 12 is forced into the groove 20 by a suitable die during mounting of the fastener 10 on the sheet metal member (FIG. 2). Although the fastener 10 has been shown with an octagonal head section 14, the head section could have a different configuration if desired, for example, hexagonal.

An inner side surface 24 of the rim 16 includes a plurality of identical indentations 28, 30, 32, 34, 36, 38, 40 and 42 (FIG. 3). The circular array of indentations 28-42 in the rim 16 are separated by flat side surfaces 44, 46, 48, 50, 52, 54, 56 and 58. The side surfaces 44-58 on the rim are disposed radially outwardly of identical indentations 62, 64, 66, 68, 70, 72, 74 and 76 formed in the shank section 18. The indentations 62-76 in the shank section 18 are separated by flat side surfaces 78, 80, 82, 84, 86, 88, 90 and 92. The flat side surfaces 78-92 on the shank section 18 are disposed radially inwardly of the indentations 28-42 formed in the rim 16.

In accordance with a feature of the present invention, the indentations 28-42 (FIG. 3) and side surfaces 44-58 on the rim 16 cooperate with the indentations 62-76 and side surfaces 78–92 on the shank section 18 to form a relatively large number of constrictions which apply deformation forces to the material of the sheet metal member 12 at a relatively large number of locations upon the application of torque loads to the fastener 10. Thus, constrictions are formed between the rim 16 and shank section 14 at locations indicated by the numerals 94, 96, 98, 100, 102, 104, 106, 108, 110, 112, 114, 116, 118, 120, 122, and 124 in FIG. 3. Upon the application of torque to the fastener 10, the rim 16 and shank section 18 tend to compress or extrude the sheet metal member with a funnel-effect to apply deformation or cold working forces to the sheet metal at the constrictions 94–124.

Shear forces are also applied to the sheet metal 12 upon the application of torque to the fastener 10. The shear forces result from a tendency to shear the sheet metal 12 at the indentations on the rim 16 and shank section 18 of the fastener. Thus, the sheet metal in the outwardly projecting indentations 28–42 in the rim of the fastener and in the inwardly projecting indentations 62–76 in the shank section of the fastener tends to be sheared off upon the application of torque to the fastener to thereby apply shear forces to the sheet metal 12.

The fastener 10 cooperates with the sheet metal 12 to have a smooth side surface 126 (FIG. 2) on a side of the sheet metal opposite from the side 127 upon which the fastener 10 is mounted (FIG. 2). To promote a smooth flow of the sheet metal into the groove 20 and particularly into the indentations 28–42 in the rim 16, the rim indentations are provided with radially and axially outwardly sloping side surfaces 128, 130, 132, 134, 136, 138, 140 and 142 (FIG. 3). The sloping side surfaces 128–142 result in a smooth flow of the sheet metal 12 into the rim indentations 28–42 when the fastener 10 is mounted on the sheet metal 12.

The fastener 12 has an internal thread convolution 146 (FIG. 2) formed on the inner side wall of an axially extending opening 148 through the fastener 10. The opening 148 is coincident with the central axis of the fastener and with the central axes of the head section 14 and shank section 18 as well as with the central axis of the generally annular groove 20. It is contemplated that the smooth inner side wall 126 of the sheet metal 12 will allow the fastener to be used in an environment in which it is desired to provide a seal between an externally threaded member and the side surface 126 of the sheet metal. It is also contemplated that the fastener 10 will be particularly satisfactory in environments where periodic repeated torque loads are applied to the fastener and/or where the sheet metal on the side opposite from the fastener must be smooth.

Head Section

The head section 14 includes the octagonal rim 16 which extends along the shank section 18 (FIG. 2) to form the annular groove 20 (FIG. 3). The axially outer end of the rim 16 has a flat bearing surface 152 (FIGS. 2 and 3) which abuttingly engages the side surface 127 of the sheet metal 12. The bearing surface 152 extends perpendicular to a central axis 156 (FIG. 2) of the fastener 10. When the fastener 10 is mounted on the sheet metal 12, the bearing surface 152 indents the sheet metal slightly.

During mounting of the fastener 10, at least a major portion of each of the rim indentations 28–42 is filled with the sheet metal 12. The identical indentations 28–42 in the rim are radially aligned with the corners 160, 162, 164, 166, 168, 170, 172 and 174 on the head section 14 (FIGS. 1 and 3). Although the fastener 10 has been shown as having relatively sharp corners 160–174, the fastener could have rounded corners if desired. The relatively sharp corners of the indentations 28–42 in the rim 16 and 62–76 in the shank section 18 could also be rounded if desired.

Figure 4:
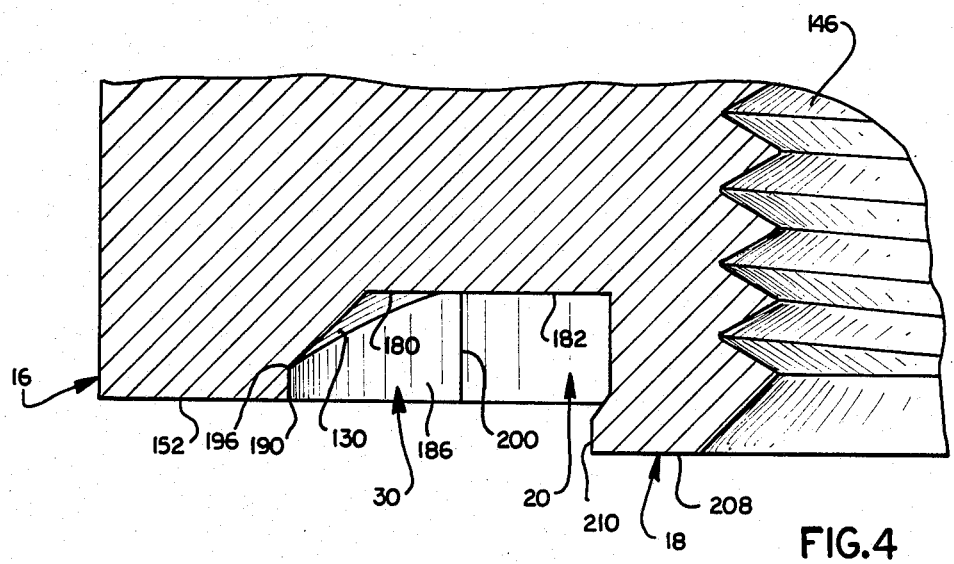
FIG. 4 is an enlarged fragmentary illustration of a portion of the fastener of FIG. 2 and illustrating the relationship between an indentation formed in the rim of the fastener and a side surface on a shank section of the fastener.

The indentation 30 in the rim 16 has a flat bottom surface 180 (FIG. 4). The bottom surface 180 is formed as a continuation of a flat annular bottom surface 182 of the groove 20. The flat bottom surfaces 180 and 182 extend parallel to the bearing surface 152 and perpendicular to the axis 156.

The sloping side surface 130 of the indentation 30 extends radially and axially outwardly from the bottom surface 180 of the indentation to an arcuate side surface 186 (FIGS. 3 and 4). The sloping surface 130 has an arcuate line 188 (FIG. 3) of intersection with the radially extending bottom surface 180. The center of curvature of the arcuate line 188 of intersection between the side and bottom surfaces 130 and 180 is disposed on the central axis 156 of the fastener 10. The arcuate side surface 186 intersects the bearing surface 152 at arcuate corner 190 (FIG. 4).

The arcuate side surface 186 forms a portion of a circle having a center 194 (FIG. 3) which is located radially inwardly of the circular central axis of the groove 20. The arcuate side surface 186 extends axially outwardly from an arcuate line 196 of intersection with the radially and axially outwardly sloping bottom surface 130. The arcuate side surface 186 also extends axially outwardly from the bottom surface 180 of the recess 30. This results in the formation of a pair of axially extending corners 200 and 202 at the line of intersection of the arcuate side surface 186 in the flat side surfaces 46 and 48 (FIG. 3).

The corners 200 and 202 have an axial depth equal to the depth of the groove 20 (FIGS. 3 and 4). Thus, the corners 200 and 202 extend between the flat bottom surface 182 of the groove 20 and the flat bearing surface 152. The arcuate side surface 186 extends axially in a direction parallel to the central axis 156 (FIG. 2) of the fastener 10. The center of curvature 194 of the surface 186 is disposed on a radial plane extending between the central axis 156 of the fastener 10 through the center of the corner 162. Although only the indentation 30 has been extensively described herein, it should be understood that the other rim indentations 28, 32, 34, 36, 38, 40 and 42 have the same configuration as the indentation 66 and are radially aligned with their associated corners.

By forming the indentations 28–42 with a relatively large radius of curvature and by providing the indentations with the sloping side surfaces 128–142, there is a relatively smooth flow of metal into the indentations 28–42 and groove 20. This is accomplished with little or no tendency for the sheet metal 12 to wrinkle as the sheet metal is forced into the indentations 28–42.

Shank Section

The shank section 18 is coaxial with the rim 16. The shank section 18 has a flat annular end surface 208 (Figs. 3 and 4) which presses into an opening in the sheet metal 12 during mounting of the fastener. The shank section 18 also has an annular bulge or taper 210 (FIGS. 2 and 4) which engages the sheet metal 12 to hold the fastener 10 against being pushed axially out of the opening in the sheet metal. Thus, the sheet metal 12 is forced axially past the bulge 210 into firm abutting engagement with the shank section 18 by suitable die as the fastener 10 is mounted on the sheet metal. The sheet metal 12 fills at least a major portion of each of the shank indentations 62-76 (FIG. 3).

Figure 5:
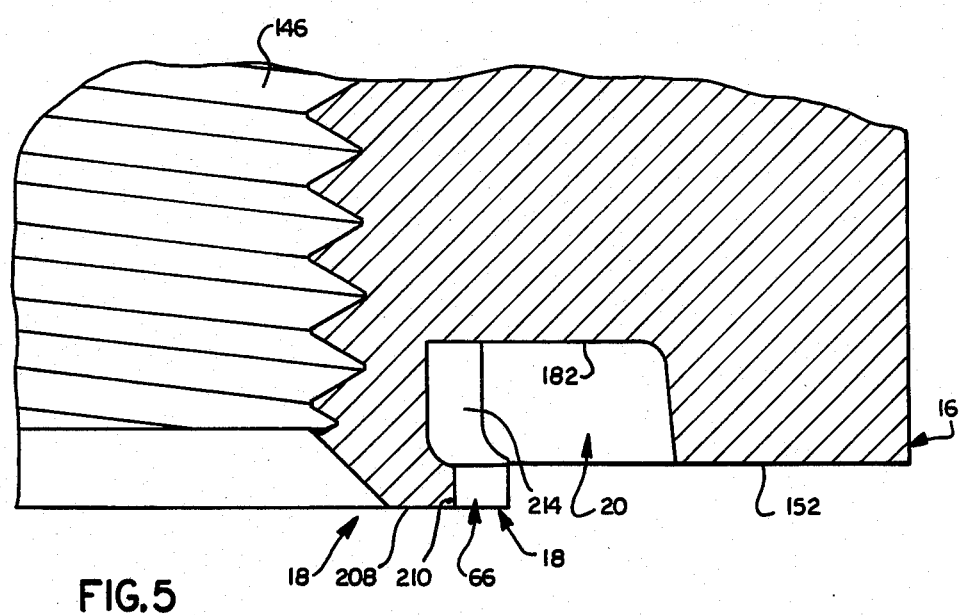
FIG. 5 is an enlarged fragmentary illustration of a portion of the fastener of FIG. 2 and illustrating the relationship between an indentation formed in the shank section of the fastener and a side surface on a rim of the fastener.

The arcuate indentations 62-76 in the shank section 18 are radially aligned with the side surfaces 44-58 on the rim 16. The indentations 62-76 extend throughout the axial extent of the shank section 18 (FIGS. 2 and 5). Thus, the flat bottom surface 182 of the groove 20 extends radially inwardly into each of the indentations 62-76. Thus, the indentation 66 extends axially inwardly from the shank end surface 208 to the bottom surface 182 of the groove 20 (see FIG. 5).

Although only the indentation 66 has been shown in FIG. 5, it should be understood that the other shank indentations 62, 64, 68, 70, 72, 74 and 76 have the same configuration as the indentation 66. The indentations 62-76 are open at their axially outer ends so that the sheet metal enters the indentations as the shank section 18 of the fastener pierces an opening through the sheet metal during mounting of the fastener on the sheet metal.

The indentation 66 has an axially extending arcuate side surface 214 which extends outwardly from the bottom surface 182 of the groove to the bulging portion 210 of the shank section. The side surface 214 then curves radially outwardly around the bulging portion 210. The arcuate side surface 214 has a radius of curvature which is disposed radially outwardly of the circular central axis of the groove 20. Thus, the center of curvature 218 for the portion of the side surface 214 which is axially inwardly from the bulge 210 is disposed slightly radially inwardly of the central portion of the side surface 48 on the rim 16 (see FIG. 3). The central axes of the curving side surfaces of the indentations 62-76 formed in the shank section 18 are disposed on radial planes extending through the center of the side surfaces 44-58 formed on the rim section 16. Similarly, the flat side surfaces 78-92 formed on the shank section 18 have central axes which are parallel to the central axis 156 (FIG. 2) of the fastener and are disposed on radial planes extending through the centers of curvature of the arcuate side surfaces, that is the side surfaces corresponding to the surface 186 in FIG. 3, of the indentations 28-42 in the rim 16.

Rotation Resistance

The fastener 10 resists rotation relative to the sheet metal 12 under the combined influence of deformation or cold working forces applied to the sheet metal at the constrictions 94-124 and shear forces applied to the sheet metal at the corners of the rim indentations 28-42 and shank indentations 62-76. Thus, upon the application of clockwise torque forces (as viewed in FIG. 3) to the fastener 10, material of the sheet metal member 12 on a counterclockwise side of the constrictions 94-124 would tend to be funneled through the constrictions with the application of cold working or deformation forces to the sheet metal. Similarly, upon the application of counterclockwise torque forces to the fastener 10, the sheet metal on the clockwise side of the constrictions 94-124 would tend to be funneled through the constrictions with a resulting application of deformation or cold working forces to the sheet metal.

These deformation or cold working forces tend to extrude the sheet metal 12 as the sheet metal tends to be forced into the constrictions 94-124. The extrusion effect results from the decrease in the distance between radially outwardly facing side surface of the shank 18 and the radially inwardly facing side surface of the rim 16. Since there are a relatively large number of constrictions, that is, sixteen constrictions 94-124 in the illustrated embodiment of the invention, the total deformation or cold working forces resisting relative rotation between the fastener 10 and sheet metal 12 is relatively large.

In addition to the cold working or deformation forces at the constrictions 94-124, shear forces are applied to the sheet metal 12 at the corners of the rim indentations 28-42 and shank indentations 62-76. Thus, when a torque urging the fastener to rotate in a counterclockwise direction (as viewed in FIG. 3) is applied to the fastener, the corner 202 of the rim indentation 30 at the corner 224 of the shank indentation 66 apply shear forces to the sheet metal 12. Although the foregoing description has been in regard to the application of counterclockwise torque to the fastener 10, the shear forces are applied to the sheet metal 12 by the corners of the rim indentations 28-42 and shank indentations 62-76 upon the application of clockwise torque to the fastener.

As a result of the combined deformation and shear forces applied to the sheet metal 12 upon the application of a torque tending to rotate the fastener 10 relative to the sheet metal, the fastener cannot be easily rotated. The resistance of the fastener 10 to rotation is promoted by the relatively large number of constrictions 94-124 formed between the rim 16 and shank 18 of the fastener to apply deformation forces to the sheet metal 12 upon application of torque to the fastener. It is believed that the resistance of the fastener 10 to rotation relative to the sheet metal 12 will be particularly important when there are to be repeated tightenings and loosenings of the externally threaded element into and out of the fastener over the operating life of the fastener.

Summary

The present invention provides a new and improved fastener 10 which is held against axial and rotational movement relative to a member 12 by the interaction between the member and the fastener. The fastener has a shank section 18 which extends axially outwardly from and is coaxial with a head section 14 of the fastener. The head section 14 includes a rim 16 which cooperates with the shank section 18 to define a groove 20 in which the material of the member 12 is received. Side surfaces 44-58 on the rim 16 are disposed radially outwardly of indentations 62-76 in the shank section 18 to form a first group of constrictions. Indentations 28-42 in the rim 16 of the fastener 10 are disposed radially outwardly of side surfaces 78-92 on the shank section to form a second group of constrictions. The two groups of constrictions apply deformation forces to the material of the member 12 upon application of torque loads to the fastener 10 to resist relative rotation between the fastener and the member.

Having described a specific preferred embodiment of the invention, the following is claimed:

1. A fastener adapted to be received in a member and held against axial and rotational movement relative to the member by interaction between the member and said fastener, said fastener comprising a head section having a central axis, a shank section extending axially outwardly from said head section and having a central axis coincident with the central axis of said head section, said head and shank sections including surface means for defining an internal thread convolution extending axially through said head and shank sections, said head section including a rim which extends axially along said shank section, said rim of said head section and said shank section cooperating to at least partially define a generally annular groove which extends around said shank section and has a generally annular bottom surface which faces axially outwardly toward an outer end portion of said shank section, said groove being adapted to receive the material of the member upon mounting of the fastener on the member, said shank section including a plurality of axially extending indentations having inner end portions disposed adjacent to the bottom surface of the groove and outer end portions disposed in the outer end portion of said shank section, said shank section including a plurality of axially extending side surfaces disposed between the indentations in said shank section and having inner end portions disposed adjacent to the bottom surface of the groove and outer end portions disposed in the outer end portion of said shank section, said indentations and said side surfaces of said shank section cooperating to form a radially inner and axially extending side wall of the groove, said indentations in said shank section intersecting said side surfaces of said shank section to form axially extending corners which apply shear forces to the material of the member upon application of torque loads to said fastener, said rim having a bearing surface which extends transverse to the central axis of said shank section and which faces axially outwardly toward the outer end portion of said shank section and which is engageable with the material of the member, said rim including a plurality of axially extending indentations having inner end portions disposed adjacent to the bottom surface of the groove and outer end portions adjacent to said bearing surface, said rim including a plurality of axially extending side surfaces disposed between the indentations in said rim and having inner end portions disposed adjacent to the bottom surface of the groove and outer end portions disposed adjacent to said bearing surface, said indentations and said side surfaces of said rim cooperating to form a radially outer and axially extending side wall of the groove, said indentations in said rim intersecting said side surfaces of said rim to form axially extending corners which apply shear forces to the material of the member upon application of torque loads to said fastener, each of said side surfaces of said rim being disposed radially outwardly of at least a portion of one of said indentations in said shank section to form a plurality of first constriction means for applying deformation forces to the material of the member at a plurality of locations disposed between said indentations in said shank section and said side surfaces of said rim upon application of torque loads to said fastener, each of said indentations in said rim being disposed radially outwardly of at least a portion of one of said side surfaces of said shank section to form a plurality of second constriction means for applying deformation forces to the material of the member at a plurality of locations disposed between said side surfaces of said shank section and said indentations in said rim upon application of torque loads to said fastener, said fastener and member cooperating to resist relative rotation under the combined influence of cold working forces applied to the material of the member by said first and second constriction means and of shear forces applied to the material of the member by the corners of said rim and shank section.

2. A fastener as set forth in claim 1 wherein at least a portion of each of said side surfaces of said shank section is flat, at least portion of each of said side surfaces of said rim being flat and being disposed in a plane which is skewed relative to planes containing the two closest side surfaces of said shank section.

3. A fastener as set forth in claim 2 wherein each of said indentations in said shank section is at least partially defined by an arcuate side surface, said arcuate side surface of each of said indentations in said shank section having a center of curvature which is disposed radially outwardly of a circular central axis of the generally annular groove.

4. A fastener as set forth in claim 3 wherein each of said indentations in said rim is at least partially defined by an arcuate side surface, said arcuate side surface of each of said indentations in said rim having a center of curvature which is disposed radially inwardly of a circular central axis of the generally annular groove.

5. A fastener as set forth in claim 1 wherein a radial plane extending through the center of one of the indentations in said rim also extends through a center of one of the side surfaces of said shank section and wherein a radial plane extending through the center of one of the indentations in said shank section also extends through the center of one of the side surfaces of said rim.

6. A fastener as set forth in claim 1 wherein each of said indentations in said rim intersects said bearing surface at an arcuate edge, each of said indentations in said rim being at least partially defined by a sloping side surface which slopes radially and axially outwardly from the bottom surface of the groove to promote a smooth flow of the material of the member into the groove upon mounting of the fastener on the member.

7. A fastener as set forth in claim 6 wherein each of said indentations in said rim is at least partially defined by an arcuate side surface which extends from one of said sloping side surfaces to said bearing surface, said arcuate side surface of each of said indentations in said rim having a center of curvature which is disposed radially inwardly of a circular central axis of the generally annular groove.

8. A fastener as set forth in claim 6 wherein said sloping side surface of each of said indentations in said rim has an arcuate line of intersection with the bottom surface of the groove, said arcuate line of intersection between the bottom of the groove and said sloping surface having a center of curvature which is disposed on the central axis of said shank section.

9. A fastener as set forth in claim 1 wherein each of said indentations in said shank section includes an axially extending arcuate side surface which has a first radius of curvature, each of said indentations in said rim includes an axially extending arcuate side surface which has a second radius of curvature which is greater than said first radius of curvature.

* * * * *